(12) United States Patent
Suzuki et al.

(10) Patent No.: US 8,211,270 B2
(45) Date of Patent: Jul. 3, 2012

(54) METHOD OF DETACHING ATTACHED BOARDS FROM EACH OTHER

(75) Inventors: Tatsuya Suzuki, Ibaraki (JP); Ryuuichi Kabutoya, Ibaraki (JP); Yuuki Fukuda, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 457 days.

(21) Appl. No.: 12/292,614

(22) Filed: Nov. 21, 2008

(65) Prior Publication Data

US 2010/0129658 A1 May 27, 2010

(51) Int. Cl.
*B32B 38/10* (2006.01)

(52) U.S. Cl. ......... 156/718; 156/763; 156/924; 156/937

(58) Field of Classification Search ................... 156/344, 156/584, 718, 763, 924, 937
See application file for complete search history.

(56) References Cited

U.S. PATENT DOCUMENTS

| 5,269,868 A | * | 12/1993 | Gofuku et al. | ................. 156/344 |
| 2002/0104616 A1 | * | 8/2002 | De et al. | ........................ 156/344 |

FOREIGN PATENT DOCUMENTS

| JP | 2002-348546 | 12/2002 |
| JP | 2004-212521 | 7/2004 |
| JP | 2008-266473 | 11/2008 |

* cited by examiner

*Primary Examiner* — Mark A Osele
*Assistant Examiner* — Nickolas Harm
(74) *Attorney, Agent, or Firm* — Wenderoth, Lind & Ponack, L.L.P.

(57) ABSTRACT

A method of detaching two plates adhered via an adhesive sheet or a curable resin layer, comprising moving, relatively parallel to each other, said two plates to develop a shear stress causing rupture of said adhesive sheet or curable resin layer. According to the present invention, two plates bonded via an adhesive sheet or a curable resin layer can be detached by only moving the two plates relatively parallel to each other. Therefore, even when at least one of the two plates is thin and poor in flexibility, two plates can be detached from each other substantially without a force (load) which causes high distortion (deformation) producing a breakage or crack on the plates. Accordingly, for example, when two optical plates adhered via a transparent adhesive sheet need to be re-bonded, two optical plates can be detached from each other and adhered again. Thus, the production cost of equipment with a display function, which carries a flat-panel display, can be reduced.

5 Claims, 5 Drawing Sheets (a)

(b)

(a)

(b)

(c)

METHOD OF DETACHING ATTACHED BOARDS FROM EACH OTHER

TECHNICAL FIELD OF THE INVENTION

The present invention relates to a peeling method capable of reusably detaching two plates adhered to each other via an adhesive sheet or curable resin layer, without causing a breakage or crack of the plates.

BACKGROUND OF THE INVENTION

In flat-panel displays such as a liquid crystal display and the like, a protection panel for protecting a display panel, which contains a transparent plates such as an acrylic panel, a glass plate and the like, is conventionally set with a certain gap from the display panel, so that when some impact is inflicted thereon, the impact will not reach the display panel.

However, since the gap is generally an air layer, a light reflection loss is produced due to the difference in the refractive index between the above-mentioned display panel or the material constituting the protection panel, and the air layer, which problematically prevents good visibility.

Hence, for example, a technique for eliminating a clearance (air layer) between a liquid crystal panel and a protection panel in liquid crystal displays is known, which includes bonding a liquid crystal panel to a transparent protection plate via a transparent adhesive sheet made of an acrylic adhesive (e.g., acrylic ester copolymer crosslinked with an epoxy, isocyanate, melamine or metal compound crosslinking agent, a UV curable acrylic adhesive and the like, which have been processed into sheets) (JP-A-2002-348546 etc.). Moreover, for a similar purpose, use of an adhesive made of a polyorganosiloxane composition having a specific plasticity (silicone adhesive) and processed into a sheet has also been proposed (JP-A-2004-212521).

As mentioned above, however, when a liquid crystal panel is adhered to a transparent protection plate via a transparent adhesive sheet in liquid crystal displays, it is not easy to adhere the liquid crystal panel to the transparent protection plate without displacement, and further, without a void between the liquid crystal panel or transparent protection plate and a two-sided adhesive sheet, which void causing a light reflection loss that degrades display visibility, and such inconvenience cannot be completely eliminated. Moreover, even if air bubbles are not enclosed during adhering by visual observation, it sometimes occurs that minute void components originally enclosed in an adhesive sheet move to the interface between the adhesive sheet and a display panel or transparent protection plate over time and form a void causing a light reflection loss, whereby the display visibility is reduced. Since silicone and acrylic transparent adhesive sheets after adhesion to a transparent protection plate or a liquid crystal panel are difficult to detach, once the above-mentioned inconvenience occurs, the expensive display panel and transparent protection plate need to be discarded. In view of such problems, therefore, the Applicants of the present application proposed a polyoxyalkylene adhesive sheet as a transparent adhesive sheet superior in redetachability, which can be stuck again (JP-A-2008-266473). Meanwhile, portable instruments with display function such as portable telephone, Personal Digital Assistant (PDA), handheld game machine, car-navigation system and the like are progressingly designed thinner at a remarkable speed in recent years, which necessitates reduction of the thickness of flat-panel displays to be mounted thereon such as a liquid crystal display and the like. As a result, for example, a display panel of a flat-panel display to be incorporated into such instruments with portable display function is designed still thinner and when, for example, a transparent protection plate of a display panel is a glass plate, a plate with a thickness of less than 1.0 mm is considered for use. However, when such a thin display panel is bonded to a transparent protection plate via the aforementioned polyoxyalkylene adhesive sheet, since the display panel and the transparent protection plate are poor in flexibility, they cannot be detached from each other without causing a breakage or crack. In flat-panel displays to be mounted on instruments with portable display function, a touch panel may be attached to a display panel. A transparent protection plate may be bonded to a glass plate with a transparent electrode, which is an operation plate of the touch panel, via a transparent two-sided adhesive sheet. In this case, also, the glass plate with a transparent electrode and the transparent protection plate problematically cannot be detached from each other without causing a breakage or crack (cannot be detached reusably). Recently, moreover, it has been proposed to form a layer by filling a highly transparent curable resin such as acrylic, urethane acrylate series, silicone series and the like, which is cured by heat or UV irradiation, between a display panel and a transparent protection plate to integrally adhere them. However, since such acrylic, urethane acrylate series and silicone series curable resin layers, which are cured by heat or UV irradiation, also adhere to a display panel and a transparent protection plate with a comparatively high adhesive strength, the transparent protection plate cannot be easily detached without causing a breakage or crack when the display panel and the thin transparent protection plate need to be re-bonded (re-adhered).

BRIEF SUMMARY OF THE INVENTION

The present invention has been made in view of the above-mentioned situation, and the problem to be solved thereby is provision of a peeling method capable of detaching two plates adhered to each other via an adhesive sheet or curable resin layer, without causing a breakage or crack of the plates.

The present inventors have conducted intensive studies in an attempt to solve the above-mentioned problem and found that a shear stress causing rupture of an adhesive sheet or curable resin layer can be developed by moving, relatively parallel to each other, two plates adhered via an adhesive sheet or a curable resin layer, which resulted in the completion of the present invention.

Accordingly, the present invention relates to (1) a method of detaching two plates adhered via an adhesive sheet or a curable resin layer, comprising moving, relatively parallel to each other, the aforementioned two plates to develop a shear stress causing rupture of said adhesive sheet or curable resin layer, (2) the method of the above-mentioned (1), wherein at least one of the two plates is moved such that straight lines specified in the surface of the adhesive sheet or curable resin layer to be adhered to one plate and the surface thereof to be adhered to the other plate, which lines being virtually parallel to each other, are skew lines, (3) the method of the above-mentioned (1), wherein the aforementioned adhesive sheet or curable resin layer is ruptured by bonding one of the two plates adhered via an adhesive sheet or a curable resin layer, bonding a part of the operation plate to the exterior surface of the other plate, and rotationally moving said other plate together with the operation plate in a flat plane orthogonal to the thickness direction of the aforementioned adhesive sheet or curable resin layer with the vicinity of the bonded part of the operation plate as an axis, (4) the method of the above-mentioned (1), wherein the aforementioned adhesive sheet or curable resin layer is ruptured by movably maintaining each of two plates adhered via the adhesive sheet or curable resin layer, and rotationally moving at least one plate in a flat plane orthogonal to the thickness direction of the aforementioned adhesive sheet or curable resin layer, (5) the method of the above-mentioned (1), wherein the two plates are optical plates and the adhesive sheet is a transparent adhesive sheet, (6) the method of the above-mentioned (2), wherein the two plates are optical plates and the adhesive sheet is a transparent adhesive sheet, (7) the method of the above-mentioned (3), wherein the two plates are optical plates and the adhesive sheet is a transparent adhesive sheet, (8) the method of the above-mentioned (4), wherein the two plates are optical plates and the adhesive sheet is a transparent adhesive sheet, (9) the method of the above-mentioned (5), wherein one of the two optical plates is a display panel of a flat-panel display and the other is a transparent protection plate to protect the aforementioned display panel,

(10) the method of the above-mentioned (6), wherein one of the two optical plates is a display panel of a flat-panel display and the other is a transparent protection plate to protect the aforementioned display panel,

(11) the method of the above-mentioned (7), wherein one of the two optical plates is a display panel of a flat-panel display and the other is a transparent protection plate to protect the aforementioned display panel,

(12) the method of the above-mentioned (8), wherein one of the two optical plates is a display panel of a flat-panel display and the other is a transparent protection plate to protect the aforementioned display panel,

(13) the method of the above-mentioned (5), wherein one of the two optical plates is a display panel of a flat-panel display and the other is a glass plate with a transparent electrode for a touch panel,

(14) the method of the above-mentioned (6), wherein one of the two optical plates is a display panel of a flat-panel display and the other is a glass plate with a transparent electrode for a touch panel,

(15) the method of the above-mentioned (7), wherein one of the two optical plates is a display panel of a flat-panel display and the other is a glass plate with a transparent electrode for a touch panel,

(16) the method of the above-mentioned (8), wherein one of the two optical plates is a display panel of a flat-panel display and the other is a glass plate with a transparent electrode for a touch panel,

(17) an adhesive sheet having two plates adhered to both main surfaces of the sheet, wherein the plates can be detached by the method of the above-mentioned (1),

(18) an adhesive sheet having two plates adhered to both main surfaces of the sheet, wherein the plates can be detached by the method of the above-mentioned (2),

(19) an adhesive sheet having two plates adhered to both main surfaces of the sheet, wherein the plates can be detached by the method of the above-mentioned (3), and

(20) an adhesive sheet having two plates adhered to both main surfaces of the sheet, wherein the plates can be detached by the method of the above-mentioned (4).

In the flat-panel display in the present specification, a display panel, a transparent protection plate disposed adjacent to the display panel, a touch panel to be inserted between the display panel and the transparent protection plate, and a plate-like optical member set on the display surface side of the flat-panel display, such as a touch panel-constituting member and the like, are collectively referred to as an "optical plate". In the present specification, moreover, the "flat-panel display" is a concept including a liquid crystal display (LCD), a plasma display (PDP), an organic or inorganic electroluminescence display (ELD), a surface-conduction electron-emitter display (SED) and the like.

According to the plate detaching method of the present invention, two plates adhered via an adhesive sheet or a curable resin layer can be detached by only moving the two plates relatively parallel to each other. Therefore, even when at least one of the two plates is thin and poor in flexibility, two plates can be detached from each other substantially without a force (load) which causes high distortion (deformation) producing a breakage or crack on the plates.

Accordingly, for example, two optical plates adhered via a transparent adhesive sheet or curable resin layer (e.g., a display panel and a transparent protection plate, a display panel and a glass plate with a transparent electrode for a touch panel, a glass plate with a transparent electrode for a touch panel and a transparent protection plate etc.), which are set on the display surface side of the flat-panel display, are plate-like members which are thin and poor in flexibility. However, such two optical plates can be detached without causing a breakage or crack according to the method of the present invention. As a result, when two optical plates adhered via a transparent adhesive sheet or curable resin layer need to be re-bonded, the two optical plates can be detached from and adhered to each other again. Thus, the production cost of equipment with a display function, which carries a flat-panel display, can be reduced.

Figure 1:
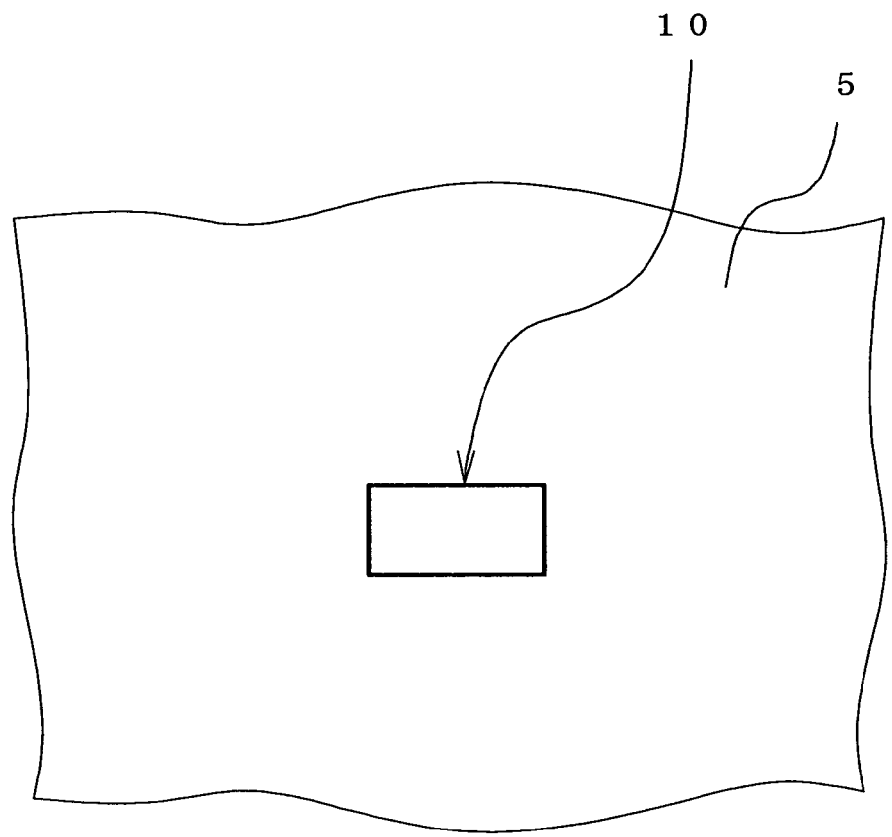
FIG. 1 is a plane view (FIG. 1(a)) and a sectional view (FIG. 1(b)) schematically showing one embodiment of the plate peeling method of the present invention, wherein a bonded laminate plate is fixed on a fixing stand.
Figure 1:
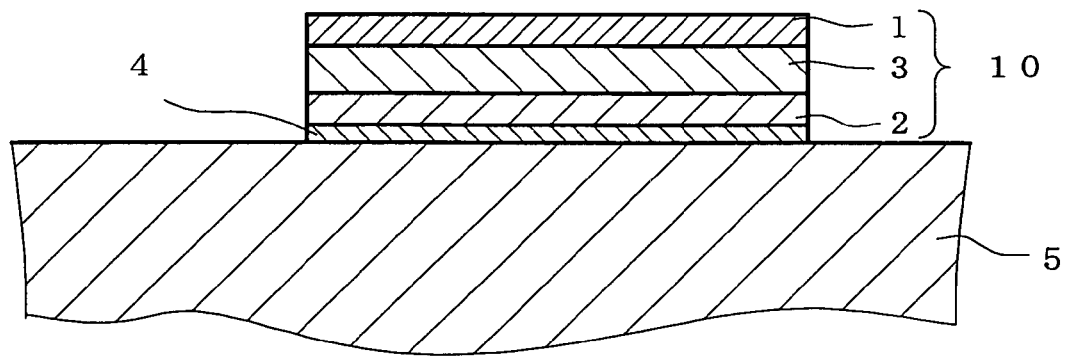
Figure 2:
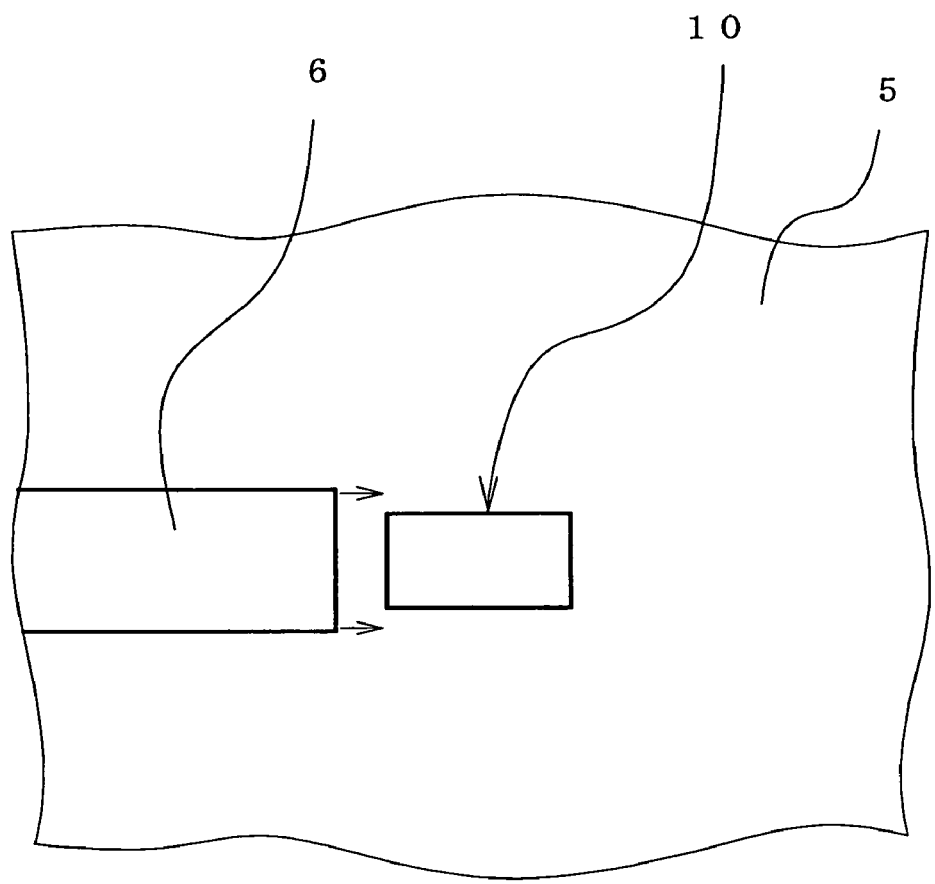
FIG. 2 shows one embodiment of the peeling method of the present invention, wherein an operation plate is fixed on a bonded laminate plate as schematically shown in a plane view (FIG. 1(a)), and an operation plate is fixed on a bonded laminate plate as schematically shown in a sectional view (FIG. 1(b)).
Figure 2:
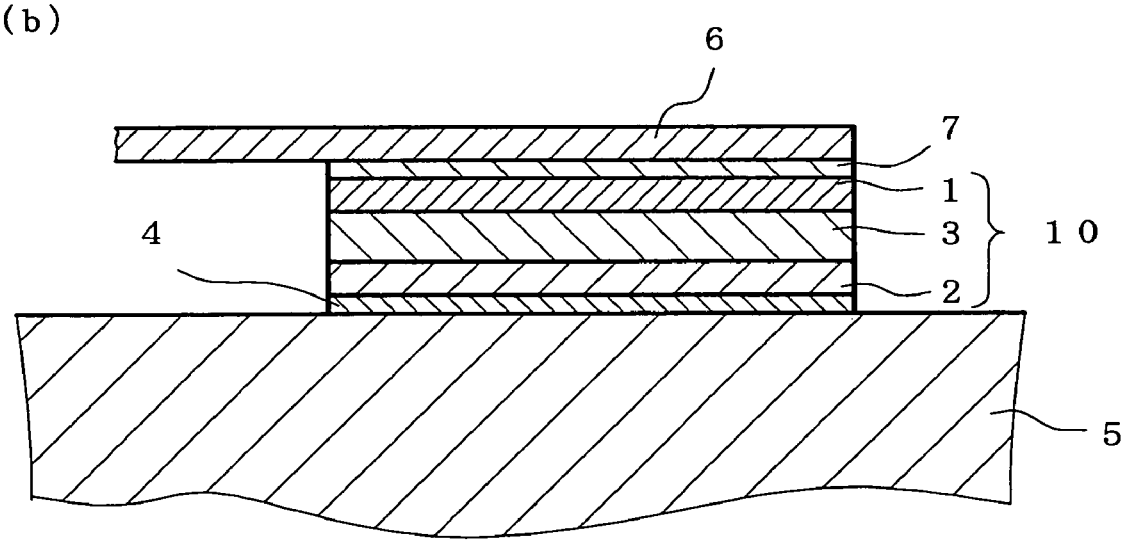

In the FIGS. 1 and 2 are plates, 3 is an adhesive sheet, 4 and 7 are thermally releasable two-sided adhesive sheets, 5 is a fixing stand, 6 is an operation plate, and 10 is a bonded laminate plate (detachment object).

DETAILED DESCRIPTION OF THE INVENTION

The present invention is explained in the following by referring to a preferable embodiment thereof.

The plate detaching method of the present invention (hereinafter to be also abbreviated as "the method of the present invention") characteristically includes moving two plates, which are adhered via an adhesive sheet or a curable resin layer, relatively parallel to each other to produce a shear stress that causes rupture of the adhesive sheet or curable resin layer.

Here, by moving two plates relatively parallel to each other is meant moving at least one of the two plates while maintaining the distance between opposing surfaces of the two plates substantially the same, where the two plates are adhered via an adhesive sheet or a curable resin layer. Particularly, a shear stress that causes rupture of the adhesive sheet or curable resin layer can be produced by moving at least one of the two plates such that virtual straight lines specified in the surface of the adhesive sheet or curable resin layer to be adhered to one plate and the surface thereof to be adhered to the other plate, which lines being virtually parallel to each other, are skew lines.

Generally, adhesive sheets are not ruptured easily even when a force (load) causing deformation is applied in the thickness direction thereof, nor are they ruptured easily even when they are linearly drawn in the direction orthogonal to the thickness direction thereof to develop a tensile stress. However, the present inventors have found that a shear stress can be easily produced in an adhesive sheet by moving the two plates relatively parallel to each other such that one principal surface side and the other principal surface side of an adhesive sheet are twisted, that is, virtual straight lines specified in the surface of the adhesive sheet to be adhered to one plate and the surface thereof to be adhered to the other plate, which lines being virtually parallel to each other, are skew lines, whereby the adhesive sheet is ruptured into two in the thickness direction thereof and the two plates are detached. They have also found that acrylic, urethane acrylate and silicone curable resin layers can also be easily ruptured by moving two plates adhered thereby relatively parallel to each other.

In the method of the present invention, two plates adhered via an adhesive sheet or a curable resin layer is simply moved relatively parallel to each other, whereby an adhesive sheet or curable resin layer is ruptured and two plates can be detached. Therefore, a force (load) causing high distortion (deformation) in the plate thickness direction is not substantially applied to the two plates. As a result, even a thin plate with comparatively high rigidity, which is susceptible to crack and breakage by an external force, can be detached without developing a crack or breakage.

Figure 3:
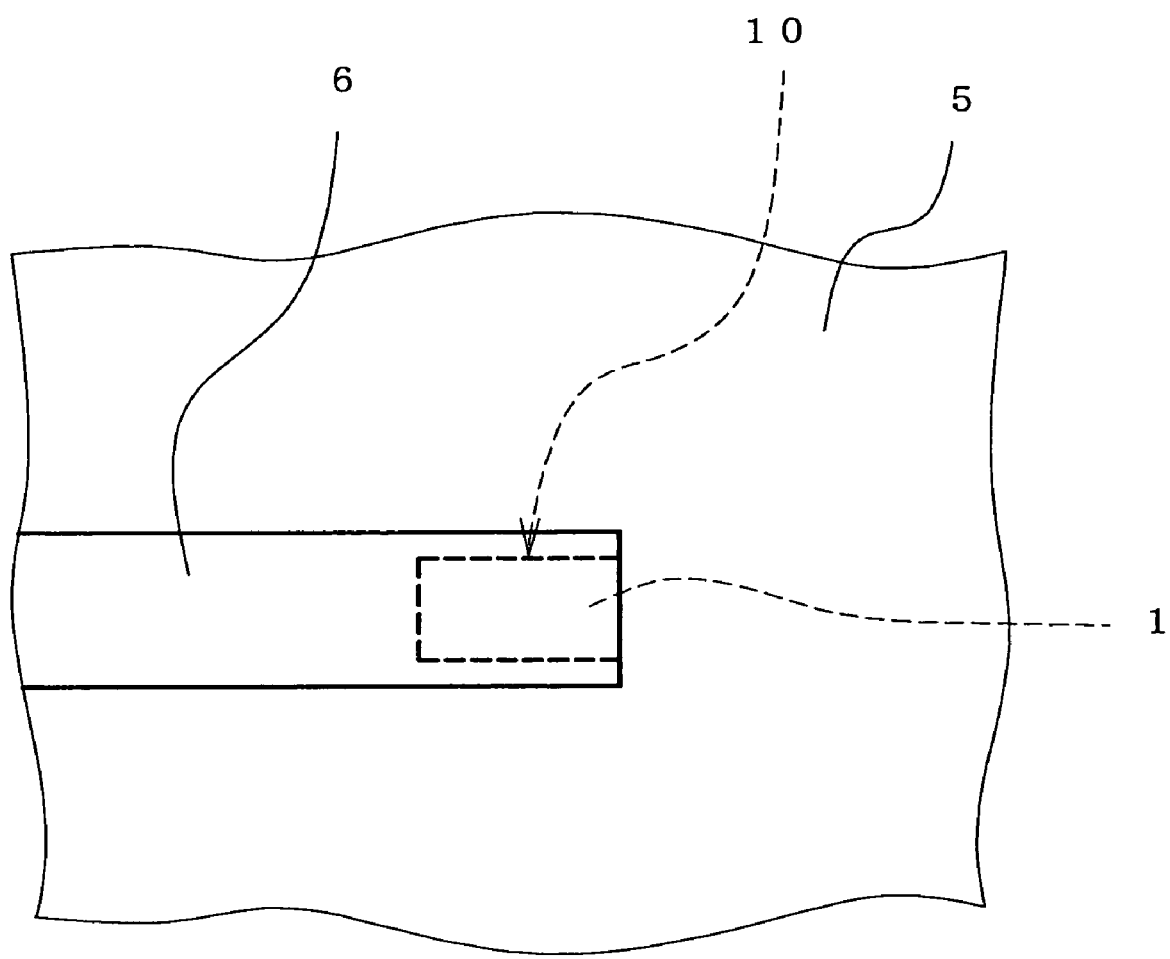
FIG. 3 is a plane view schematically showing one embodiment of the peeling method of the present invention, wherein an operation plate is fixed on a bonded laminate plate.
Figure 4:
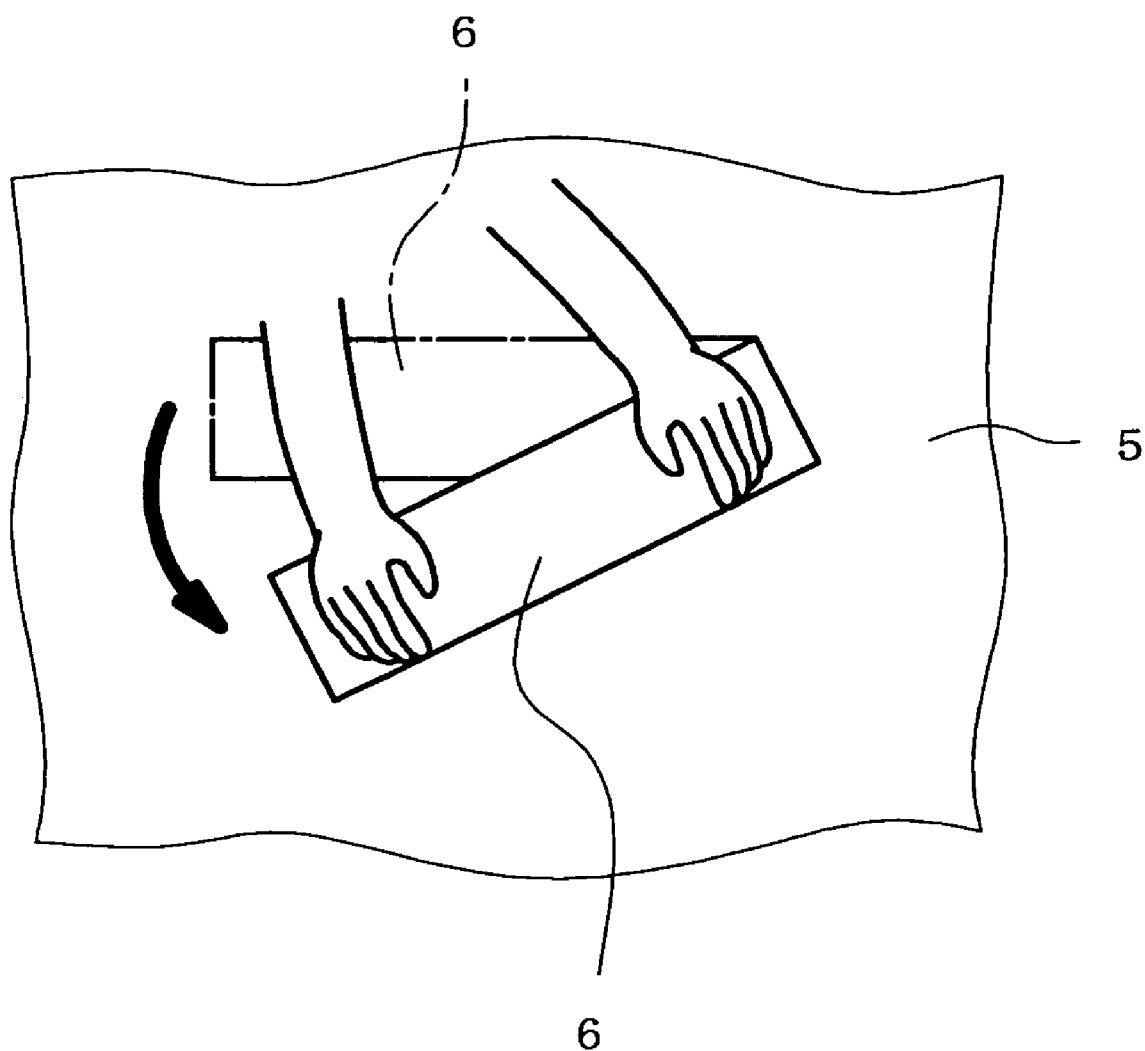
FIG. 4 is a plane view schematically showing one embodiment of the plate peeling method of the present invention, wherein an operation plate fixed on a bonded laminate plate is moved to the direction of rotation with the vicinity of the fixed part of the bonded laminate plate as an axis.
Figure 5:
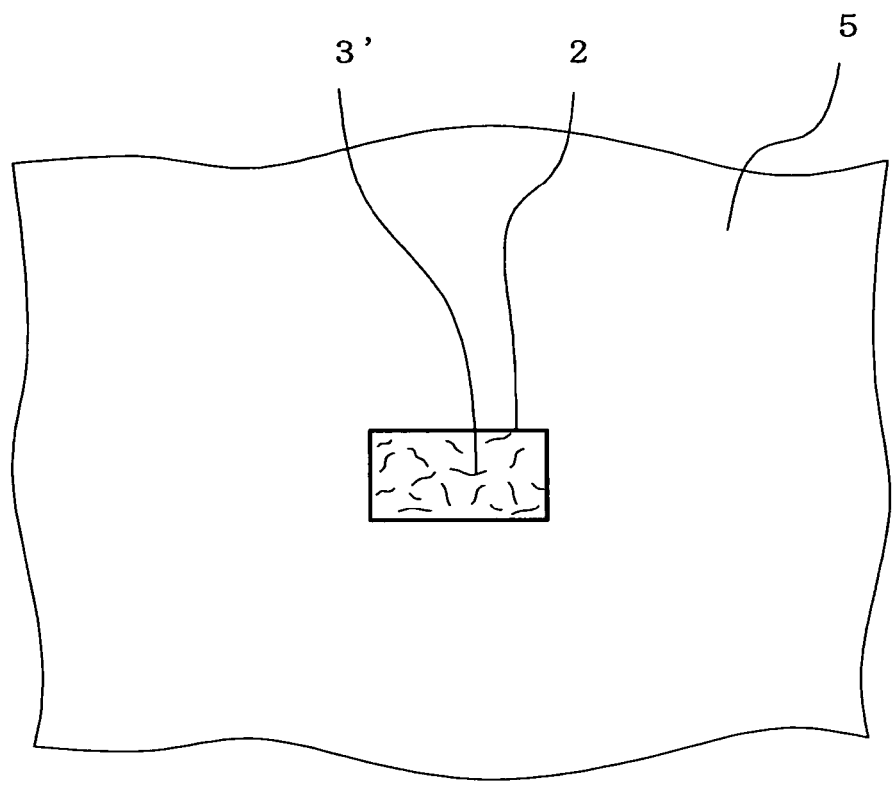
FIG. 5 shows one embodiment of the plate peeling method of the present invention, wherein the state of a fixing plate on which one plate is fixed as schematically shown in a plane view (FIG. 5(a)) and a sectional view (FIG. 5(b)), and the state of an operation plate to which the other plate is fixed as schematically shown in (FIG. 5(c)), all immediately after two plates are detached from the bonded laminate plate.
Figure 5:
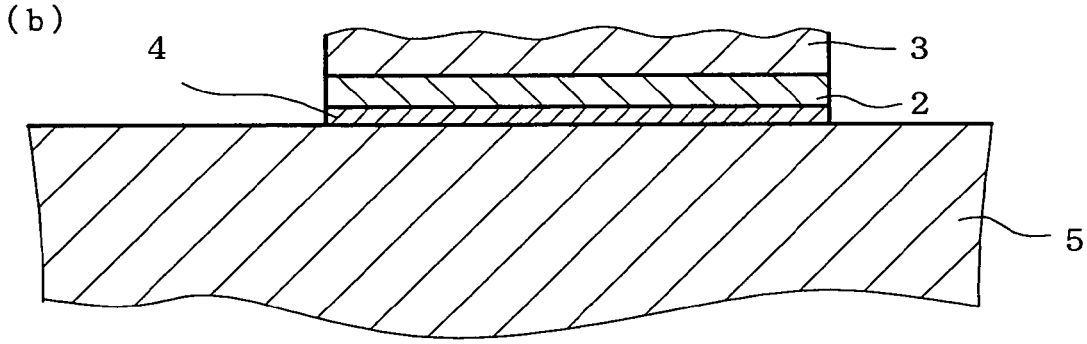
Figure 5:
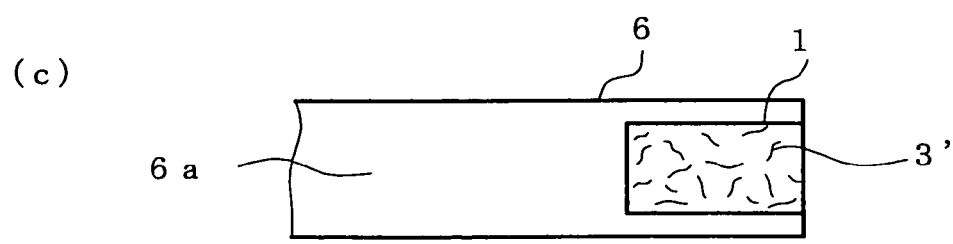

FIGS. 1-4 schematically show one embodiment of the plate detaching method of the present invention. In the method of such embodiment, firstly, a bonded laminate plate (detachment object) 10 wherein two plates 1, 2 are adhered via an adhesive sheet 3 is bonded on a fixing stand 5 via a thermally releasable two-sided adhesive sheet 4 (i.e., one plate 2 in the bonded laminate plate 10 is bonded on a fixing stand 5 via a thermally releasable two-sided adhesive sheet 4) as shown in FIG. 1(*a*), (*b*), and a part of one end of an operation plate 6 is bonded on a plate (the other plate) 1 of the bonded laminate plate 10, which plate is on the opposite side from the fixing stand 5 side, via a thermally releasable two-sided adhesive sheet (FIG. 2(*a*), (*b*)). FIG. 3 is a plane view showing the operation plate 6 bonded on the plate 1 of the bonded laminate plate 10. Thereafter, as shown in FIG. 4, the vicinity of the bonded part of the operation plate 6 with the bonded laminate plate 10 is pressed with one hand, the other hand is placed on the opposite side (the other end side) from the bonded part of the operation plate 6 with the bonded laminate plate 10, and the operation plate 6 is moved to the direction of rotation (arrow direction in the Figure) with the vicinity of the fixed part (pressed by hand) of the operation plate 6 with the bonded laminate plate 10 as an axis. As a result, the adhesive sheet 3 is deformed to twist one principal surface side from the other principal surface side and develop a shear stress. When the angle of move (rotation angle) of the operation plate 6 exceeds a certain angle (i.e., when the skew angle between virtual straight lines specified in the surface of the adhesive sheet 3 to be adhered to one plate 2 and in the surface to be adhered to the other plate 1, which lines being parallel to each other, exceeds a given angle), the adhesive sheet 3 is ruptured, one plate 2 in the bonded laminate plate 10 is bonded on the fixing stand 5 (FIG. 5(*a*), (*b*)), the other plate 1 is bonded on the backside 6a of the operation plate 6 (FIG. 5(*c*)), whereby the two plates are detached. Then, thermally releasable two-sided adhesive sheets 4, 7 adhered to the two plates 1, 2 are each heated to release them from the plates, and residue 3' of the adhesive sheet 3 attached to the plates 1, 2 is washed away with a solvent, whereby the two plates 1, 2 are reusably reproduced.

As shown above, in the method of such embodiment, a shear stress causing rupture of an adhesive sheet can be easily produced by fixing any one plate of the two plates adhered via an adhesive sheet to a fixing stand, bonding an operation plate to the other plate, and manually handling the operation plate (rotational transfer of the other plate together with the operation plate in a flat plane parallel to the principal surface of an adhesive sheet, using the vicinity of the bonded part of the operation plate as an axis), whereby the plates can be reusably detached.

The thermally releasable two-sided adhesive sheets 4, 7 used for fixing (bonding) the above-mentioned bonded laminate plate 10 to the fixing stand 5 and the operation plate 6 are two-sided adhesive sheets having pressure sensitive adhesive layers made of a detachable pressure-sensitive adhesive, which adhere to the both surfaces of a supporting substrate by pressurization and express repeelability by heating after adhesion. As such thermally releasable two-sided adhesive sheet, known ones can be used without limitation. Preferred are those described in, for example, JP-A-1993-043851, JP-A-1990-305878, JP-A-1988-33487 and the like. When the rupture shear stress of the thermally releasable two-sided adhesive sheet is smaller than the rupture shear stress of the adhesive sheet 3 in the bonded laminate plate 10, the thermally releasable two-sided adhesive sheets 4, 7 are ruptured earlier. Thus, the thermally releasable two-sided adhesive sheets 4, 7 should have a greater rupture shear stress than that of the adhesive sheet 3 in the bonded laminate plate 10. Generally, thermally releasable two-sided adhesive sheets have a supporting substrate. Therefore, the rupture shear stress thereof is greater than that of the adhesive sheet 3 in the bonded laminate plate 10.

In the method of one embodiment shown in FIGS. 1-4, thermally releasable two-sided adhesive sheet 4, 7 were used for fixing (bonding) the bonded laminate plate 10 to the fixing stand 5 and operation plate 6. It is also possible to use a fixing stand provided with an adsorption mechanism instead of the thermally releasable two-sided adhesive sheet 4 and fix the bonded laminate plate 10 to the fixing stand by adsorption.

Alternatively, without using the operation plate 6, a plate 1 on the opposite side from the fixing stand side of the bonded laminate plate 10 may be directly adsorbed by a chucking apparatus provided with a sucker and the like and movably maintained, and the plate 1 may be rotationally moved to develop a shear stress in the adhesive sheet 3. Furthermore, a UV curable releasable two-sided adhesive sheet wherein a pressure sensitive adhesion layer made of a releasable pressure sensitive adhesive (acrylic, urethane and other adhesives) which adheres by pressurization and, after adhesion, cures by UV irradiation and expresses repeelability is formed on both surfaces of a supporting substrate, a highly friction resistant rubber sheet and the like can also be used instead of the thermally releasable two-sided adhesive sheets 4, 7. In the method of the present invention, therefore, the means for fixing (bonding) a bonded laminate plate (detachment object) during plate detachment operation is not particularly limited.

Moreover, when the method of the present invention is industrially practiced, the aforementioned adhesive sheet may be ruptured by maintaining each of two plates adhered via the adhesive sheet or curable resin layer by a rotationary movable chucking apparatus provided with a sucker and the like, and rotationally moving at least one of the two plates in a flat plane orthogonal to the thickness direction of the aforementioned adhesive sheet. In such embodiment, a plate can be detached at a high-speed and continuously.

As the two plates as detachment object in the method of the present invention, for example, plates (plate-like product) made from various materials such as glass plate, metal plate, plastic plate and the like can be used without any particular limitation. However, plates rich in flexibility can be detached without developing cracks or breakage even when the method of the present invention is not applied. In addition, when a plate to be the detachment target in the method of the present invention is deformed, a shear stress necessary for rupture of an adhesive sheet cannot be developed. In the case of a plastic plate, therefore, a plate made of a plastic material having comparatively high rigidity and having a Young's modulus of generally not less than 1.5 GPa normally becomes the target. In addition, when the plate has a small thickness, a plastic plate having comparatively high rigidity tends to develop cracks and breakage. When a plastic plate has a thickness of 5 mm, therefore, the method of the present invention is particularly effective. Although metal plates generally do not develop cracks and breakage easily even when the thickness is small, since the method of the present invention can detach a plate from a two-sided adhesive sheet by a simple operation, it is also effective even when the detachment target plate is a metal plate. On the other hand, since glass plates are poor in the flexibility and easily develop cracks and breakage when the thickness is small, the method of the present invention is particularly effective when the detachment target plate is a glass plate. As shown in the below-mentioned Examples, even when the thickness of a glass plate is 1 mm or below, it can be detached from an adhesive sheet without developing cracks and breakage. For example, a liquid crystal panel of a liquid crystal display is generally a laminate in the order of a polarizing plate (polarizing filter)/a transparent plate (glass plate, plastic plate)/a liquid crystal material sandwiched between transparent electrodes/a transparent plate (glass plate, plastic plate)/a polarizing plate (polarizing filter); a touch panel is generally a laminate in the order of a glass plate having a transparent electrode/an adhesion layer/a transparent electrode; a transparent protection plate to protect a liquid crystal panel is adhered, via a transparent adhesive sheet, to a polarizing plate (polarizing filter) of an assembled liquid crystal panel, or adhered, via a transparent adhesive sheet, to a polarizing plate (polarizing filter) before assembly of a liquid crystal panel; and a transparent protection plate to protect a touch panel is adhered, via a transparent adhesive sheet, to a glass plate having a transparent electrode of an assembled touch panel, or adhered, via a transparent adhesive sheet, to a glass plate having a transparent electrode before assembly of a touch panel.

In the present invention, the "two plates adhered via an adhesive sheet or a curable resin layer (bonded laminate plate)" is a concept including not only a laminate product with a laminate constitution of plate/adhesive sheet/plate, but also a laminate structure with a laminate constitution of plate/adhesive sheet/plate in equipment or apparatus. In other words, when one plate of a laminate structure with a laminate constitution of plate/adhesive sheet/plate in equipment or apparatus is exposed, the method of the present invention can be practiced. In this case, for example, an operation plate may be fixed (bonded) on exposed one plate, or may be directly adsorbed and maintained by a chucking apparatus provided with a sucker, and said one plate is moved in a flat plane orthogonal to the thickness direction of an adhesive sheet, whereby two plates can be detached without developing cracks and breakage.

As explained in the aforementioned BACKGROUND OF THE INVENTION, the thickness of flat-panel displays such as a liquid crystal display and the like to be mounted on portable instruments with display function such as portable telephone, Personal Digital Assistant (PDA), handheld game machine, car-navigation system and the like needs to be smaller in recent years, a display panel of a flat-panel display is designed still thinner, and a transparent protection plate to protect a display panel, a touch panel to be inserted between a display panel and a transparent protection plate, and the like are becoming thinner. As an optical plate to be set on the display surface side of such flat-panel display, a glass plate and a transparent plastic plate having comparatively high rigidity are used, where adjacent two optical plates are adhered via a transparent adhesive sheet. Recently, moreover, it has been proposed to form a layer by filling a highly transparent curable resin such as acrylic and silicone series, which is cured by heat or UV irradiation, between a display panel and a transparent protection plate to integrally adhere them. However, since such acrylic, urethane acrylate series, silicone series and the like curable resin layers, which are cured by heat or UV irradiation, also adhere to a display panel and a transparent protection plate with a comparatively high adhesive strength, the transparent protection plate cannot be easily detached without causing a breakage or crack when the display panel and the thin transparent protection plate need to be re-bonded (adhered). Accordingly, the method of the present invention is particularly effective when such two optical plates adhered via a transparent adhesive sheet or highly transparent curable resin layer are to be detached. To be specific, when, in two optical plates (e.g., a display panel and a transparent protection plate, a display panel and a glass plate with a transparent electrode for a touch panel, a glass plate with a transparent electrode for a touch panel and a transparent protection plate etc.) adhered via a transparent adhesive sheet or highly transparent curable resin layer (acrylic, urethane acrylate series, silicone series and other curable resin layers that are cured by heat or UV irradiation), displacement between a transparent adhesive sheet or highly transparent curable resin layer and an optical plate, or a void in the interface between a transparent adhesive sheet or highly transparent curable resin layer and an optical plate occurs to necessitate re-bonding, the two optical plates can be detached from the transparent adhesive sheet or highly transparent curable resin layer without developing cracks and breakage, thus enabling re-utilization of expensive optical plates.

As the transparent protection plate for a flat-panel display to be the detachment target in the method of the present invention, a glass plate and a transparent plastic plate can be mentioned. As the transparent plastic plate, plastic plates made of (meta)acrylic resin (e.g., PMMA), polycarbonate (PC), polypropylene (PP), polyphenylene sulfide, poly(ethylene terephthalate) (PET), poly(ethylene naphthalate) (PEN), triacetylcellulose (TAC) resin, ARTON, epoxy resin, polyimide resin, polyetherimide resin, polyamide resin, polysulphone, polyethersulfone and the like can be mentioned, where the thickness thereof is about 0.01-5 mm. As the glass plate, soda glass plate, borosilicate glass, alkali-free glass plate and the like can be mentioned, where the thickness thereof is about 0.01-5 mm.

As the glass plate having a transparent electrode for a touch panel, soda glass plate, borosilicate glass plate, alkali-free glass plate and the like can be mentioned, where the thickness thereof is about 0.01-5 mm.

In the present invention, the "adhesive sheet" means a sheet-like product of acrylic, silicone series, urethane series and other known pressure-sensitive adhesives used for apparatuses and equipments in various fields for adhering metal plates, plastic plates and the like. While the thickness is not particularly limited, it is generally 10-1000 μm.

In the present invention, the "transparent adhesive sheet" means a two-sided adhesive sheet made from a highly transparent adhesive composition, which is particularly used for adhesion of two optical plates. From the aspects of adhesion strength between two optical plates and thin-shaped flat-panel display, it generally has a thickness of about 20-250 μm.

As such transparent adhesive sheet, known transparent adhesive sheets used for optical purposes can be mentioned. Particularly preferred are acrylic, silicone series and other transparent adhesive sheets, and the polyoxyalkylene series transparent adhesive sheet proposed by the present Applicant in JP-A-2008-266473 can be mentioned.

[Acrylic Transparent Adhesive Sheet]

As the acrylic transparent adhesive sheet, an adhesive sheet of an acrylic adhesive comprising, as a base polymer, an acrylic polymer containing an alkyl(meth)acrylate monomer unit as a main skeleton can be specifically mentioned (here, "(meth)acrylate" means "acrylate and/or methacrylate").

The alkyl group of alkyl(meth)acrylate constituting the main skeleton of the acrylic polymer has an average carbon number of about 1-12. Specific examples of alkyl(meth)acrylate include methyl(meth)acrylate, ethyl(meth)acrylate, n-butyl(meth)acrylate, 2-ethylhexyl(meth)acrylate, isooctyl (meth)acrylate, isononyl(meth)acrylate, lauryl(meth)acrylate and the like, which can be used alone or in combination. Particularly, alkyl(meth)acrylate containing an alkyl group having a carbon number of 1-9 is preferable.

To improve adhesiveness and heat resistance, one or more kinds of various monomers are introduced into the acrylic polymer by copolymerization. Specific examples of such copolymerizable monomer include monomers containing a hydroxyl group such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl (meth)acrylate, (4-hydroxymethylcyclohexyl)-methylacrylate and the like; monomers containing a carboxyl group such as (meth)acrylic acid, carboxyethyl(meth)acrylate, carboxypentyl(meth)acrylate, itaconic acid, maleic acid, fumaric acid, crotonic acid and the like; monomers containing an acid anhydride group such as maleic anhydride, itaconic anhydride and the like; caprolactone adduct of acrylic acid; monomers containing a sulfonic acid group such as styrenesulfonic acid, allylsulfonic acid, 2-(meth)acrylamide-2-methylpropanesulfonic acid, (meth)acrylamidepropanesulfonic acid, sulfopropyl(meth)acrylate, (meth)acryloyloxynaphthalenesulfonic acid and the like; monomers containing a phosphoric acid group such as 2-hydroxyethylacryloylphosphate and the like; and the like. Examples also include nitrogen-containing vinyl monomers, such as maleimide, N-cyclohexylmaleimide, N-phenylmaleimide; N-acryloylmorpholine; (N-substitution)amide monomers such as (meta)acrylamide, N,N-dimethyl(meta)acrylamide, N,N-diethyl(meta)acrylamide, N-hexyl(meta)acrylamide, N-methyl(meta)acrylamide, N-butyl(meta)acrylamide, N-butyl(meta)acrylamide, N-methylol(meta)acrylamide, N-methylolpropane(meta)acrylamide and the like; (meth)acrylic acid alkylaminoalkyl monomers such as (meth)acrylic acid aminoethyl, aminopropyl (meth)acrylate, N,N-dimethylaminoethyl(meth)acrylate, t-butylaminoethyl(meth)acrylate, 3-(3-pyridinyl)propyl (meth)acrylate and the like; (meth)acrylic acid alkoxyalkyl monomers such as methoxyethyl(meth)acrylate, ethoxyethyl (meth)acrylate and the like; succinimide monomers such as N-(meta)acryloyloxymethylenesuccinimide, N-(meta)acryloyl-6-oxyhexamethylenesuccinimide, N-(meta)acryloyl-8-oxyoctamethylenesuccinimide, N-acryloylmorpholine and the like; and the like.

Moreover, vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, N-vinylcaprolactam and the like; cyanoacrylate monomers such as acrylonitrile, methacrylonitrile and the like; epoxy group-containing acrylic monomers such as (meth)acrylic acid glycidyl and the like; glycol acrylic ester monomers such as (meth)acrylic acid polyethylene glycol, (meth)acrylic acid polypropylene glycol, (meth)acrylic acid methoxymethylene glycol, (meth)acrylic acid methoxypolypropylene glycol and the like; acrylic acid ester monomers such as (meth)acrylic acid tetrahydrofurfuryl, fluorine (meth)acrylate, silicone(meth)acrylate, 2-methoxyethylacrylate and the like; and the like can be mentioned.

Among these, hydroxyl group-containing monomers are preferable since they show good reactivity with isocyanate group when an isocyanate crosslinking agent is used as a crosslinking agent. From the aspects of adhesiveness to a liquid crystal panel and a transparent protection plate and adhesion durability, moreover, carboxyl group-containing monomers such as acrylic acid and the like are preferable, and acrylic acid is particularly preferable.

The ratio of the copolymerizable monomer in an acrylic polymer is preferably about 0.1-10 wt % by weight.

While the average molecular weight of the acrylic polymer is not particularly limited, the weight average molecular weight is generally about 300,000-2,500,000.

The acrylic polymer can be produced by various known means, and a radical polymerization method such as bulk-polymerization method, solution-polymerization method, suspension-polymerization method and the like can be appropriately selected. As a radical polymerization initiator, various known azo and peroxide initiators can be used. The reaction temperature is generally about 50-80° C., and the reaction time is 1-8 hr.

The acrylic adhesive can contain, in addition to a base polymer, a crosslinking agent, which improves adhesion to optical plates and durability, as well as affords reliability at high temperature and maintenance of the shape of an adhesive itself. As the crosslinking agent, known crosslinking agents such as isocyanate series, epoxy series, peroxide series, metal chelate series, oxazoline series and other agents can be used as appropriate. These crosslinking agents can be used alone or in a combination of two or more kinds. The amount of the crosslinking agent to be used is not more than 10 parts by weight, preferably 0.01-5 parts by weight, more preferably 0.02-3 parts by weight, per 100 parts by weight of the acrylic polymer. When the amount of the crosslinking agent to be used exceeds 10 parts by weight, crosslinking proceeds too much and adhesiveness may be unpreferably degraded.

The aforementioned adhesive may also contain, where necessary, various additives such as tackifier, plasticizer, filler made of glass fiber, glass bead, metal powder, other inorganic powder etc., pigment, colorant, antioxidant, UV absorber, silane coupling agent and the like as appropriate.

The production method of an adhesive sheet is not particularly limited and, for example, a method including applying a photopolymerizable composition containing a monomer for copolymerization with a monomer for main skeleton of base polymer, a radical polymerization initiator, a crosslinking agent and the like to a surface of a mold-release sheet subjected to a release treatment to form a coated film with a given thickness, adhering thereto a surface of a mold-release sheet subjected to a release treatment, and exposing the resulting product to UV irradiation to allow a polymerization reaction to proceed, whereby an adhesive sheet is formed, can be mentioned.

[Transparent Silicone Adhesive Sheet]

The transparent silicone adhesive sheet is not particularly limited and, for example, known transparent silicone adhesive sheets using the polyorganosiloxane composition described in JP-A-2004-212521 and the like, and the like can be mentioned.

[Transparent Polyoxyalkylene Adhesive Sheet]

A transparent adhesive sheet configured with a cure product prepared by curing a composition comprising the following A to C:

A: polyoxyalkylene-series polymer having at least one alkenyl group in each molecule
B: compound comprising an average of two or more hydrosilyl groups in each molecule
C: hydrosilylation catalyst can be mentioned.

In the present invention, the main component A polyoxyalkylene-series polymer having at least one alkenyl group in each molecule is not subject to limitation, and various types can be used; in particular, one wherein the main chain of the polymer has a repeat unit represented by the formula (1) shown below is preferable:

$$—R^1—O—\qquad\text{formula (1):}$$

wherein $R^1$ is an alkylene group.

$R^1$ is preferably a linear or branched alkylene group having 1 to 14, more preferably 2 to 4, carbon atoms.

As specific examples of the repeat unit represented by the general formula (1), —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, —CH$_2$CH$_2$CH$_2$CH$_2$O— and the like can be mentioned. The main chain skeleton of the polyoxyalkylene-series polymer may consist of only one kind of repeat unit, and may consist of two kinds or more of repeat units. Particularly, with regard to availability and workability, a polymer with —CH$_2$CH(CH$_3$)O— as the main repeat unit is preferable. In the main chain of the polymer, a repeat unit other than the oxyalkylene group may be contained. In this case, the total sum of oxyalkylene units in the polymer is preferably not less than 80% by weight, particularly preferably not less than 90% by weight.

Although the component A polymer may be a linear polymer or a branched polymer, or a mixture thereof, it is preferable, for obtaining good adhesiveness, that the component A polymer contain a linear polymer at not less than 50% by weight.

The molecular weight of the component A polymer is preferably 500 to 50,000, more preferably 5,000 to 30,000, in terms of number-average molecular weight.

The component A polymer preferably has a narrow molecular weight distribution wherein the ratio of weight-average molecular weight and number-average molecular weight (Mw/Mn) is not more than 1.6; a polymer having an Mw/Mn of not more than 1.6 produces a decreased viscosity of the composition and offers improved workability. Hence, the Mw/Mn is more preferably not more than 1.5, still more preferably not more than 1.4. As mentioned herein, Mw/Mn refers to a value obtained by the gel permeation chromatography (GPC) method.

With regard to the component A polymer (polyoxyalkylene-series polymer having at least one alkenyl group in each molecule), the alkenyl group is not subject to limitation, but an alkenyl group represented by the formula (2) shown below is suitable:

$$H_2C=C(R^2)\qquad\text{formula (2):}$$

wherein $R^2$ is hydrogen or a methyl group.

The mode of binding of the alkenyl group to the polyoxyalkylene-series polymer is not subject to limitation; for example, alkenyl group direct bond, ether bond, ester bond, carbonate bond, urethane bond, urea bond and the like can be mentioned.

As specific examples of the component A polymer, a polymer represented by the general formula (3): $\{H_2C=C(R^{3a})—R^{4a}—O\}a_1R^{5a}$ wherein $R^{3a}$ is hydrogen or a methyl group; $R^{4a}$ is a divalent hydrocarbon group having 1 to 20 carbon atoms, optionally having one or more ether groups, $R^{5a}$ is a polyoxyalkylene-series polymer residue; $a_1$ is a positive integer, can be mentioned. As $R^{4a}$ in the formula, specifically, —CH$_2$—, —CH$_2$CH$_2$—, —CH$_2$CH$_2$CH$_2$—, —CH$_2$CH(CH$_3$)CH$_2$—, —CH$_2$CH$_2$CH$_2$CH$_2$—, —CH$_2$CH$_2$OCH$_2$CH$_2$—, or —CH$_2$CH$_2$OCH$_2$CH$_2$CH$_2$— and the like can be mentioned; for the ease of synthesis, —CH$_2$— is preferable.

A polymer having an ester bond, represented by the formula (4): $\{H_2C=C(R^{3b})—R^{4b}—OCO\}a_2R^{5b}$ wherein $R^{3b}$, $R^{4b}$, $R^{5b}$ and $a_2$ have the same definitions as those of $R^{3a}$, $R^{4a}$, $R^{5a}$, and $a_1$, respectively, can also be mentioned.

A polymer represented by the formula (5): $\{H_2C=C(R^{3c})\}a_3R^{5c}$ wherein $R^{3c}$, $R^{5c}$ and $a_3$ have the same definitions as those of $R^{3a}$, $R^{5a}$, and $a_1$, respectively, can also be mentioned.

Furthermore, a polymer having a carbonate bond, represented by the formula (6): $\{H_2C=C(R^{3d})—R^{4d}—O(CO)O\}a_4R^{5d}$ wherein $R^{3d}$, $R^{4d}$, $R^{5d}$ and $a_4$ have the same definitions as those of $R^{3a}$, $R^{4a}$, $R^{5a}$ and $a_1$, respectively, can also be mentioned.

It is preferable that at least 1, preferably 1 to 5, more preferably 1.5 to 3, alkenyl groups be present in each molecule of the component A polymer. If the number of alkenyl groups contained in each molecule of the component A polymer is less than 1, the curing is insufficient; if the number exceeds 5, the mesh structure becomes so dense that the polymer sometimes fails to exhibit a good adherence. The component A polymer can be synthesized according to the method described in Japanese Patent Kokai Publication No. 2003-292926, and any commercially available product can be used as is.

Any component B compound comprising an average of two or more hydrosilyl groups in each molecule can be used without limitation, as long as it has a hydrosilyl group (a group having an Si—H bond), but from the viewpoint of the ease of obtainment of raw materials and compatibility with the component A, an organohydrogen polysiloxane modified with an organic constituent is particularly preferable. The aforementioned polyorganohydrogen siloxane modified with an organic constituent more preferably has an average of 2 to 8 hydrosilyl groups in each molecule. Specific examples of the structure of the polyorganohydrogen siloxane include linear or cyclic ones represented by, for example:

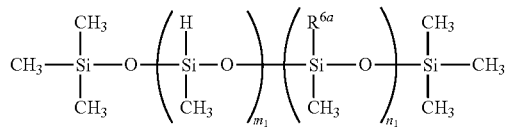

wherein $2 \leq m_1 + n_1 \leq 50$, $2 \leq m_1$, and $0 \leq n_1$, $R^{6a}$ is a hydrocarbon group having 2 to 20 carbon atoms in the main chain thereof, optionally comprising one or more phenyl groups,

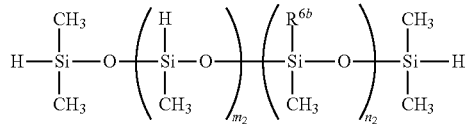

wherein $0 \leq m_2 + n_2 \leq 50$, $0 \leq m_2$, and $0 \leq n_2$, $R^{6b}$ is a hydrocarbon group having 2 to 20 carbon atoms in the main chain thereof, optionally comprising one or more phenyl groups, or

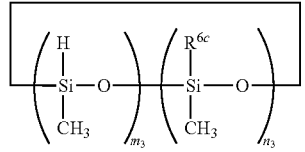

wherein $3 \leq m_3 + n_3 \leq 20$, $2 \leq m_3 \leq 19$, and $0 \leq n_3 < 18$, $R^{6c}$ is a hydrocarbon group having 2 to 20 carbon atoms in the main chain thereof, optionally having one or more phenyl groups, and the like, and ones having two or more of these units, represented by the following:

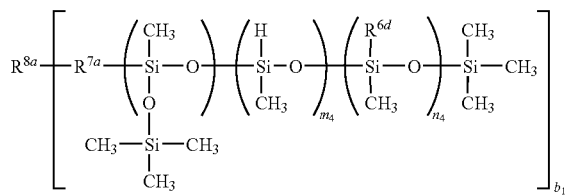

wherein $1 \leq m_4 + n_4 \leq 50$, $1 \leq m_4$, and $0 \leq n_4$, $R^{6d}$ is a hydrocarbon group having 2 to 20 carbon atoms in the main chain thereof, optionally having one or more phenyl groups, $2 \leq b_1$, $R^{8a}$ is a divalent to tetravalent organic group, and $R^{7a}$ is a divalent organic group, but $R^{7a}$ may be absent depending on the structure of $R^{8a}$,

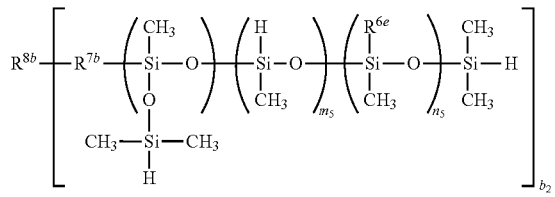

wherein $0 \leq m_5 + n_5 \leq 50$, $0 \leq m_5$, and $0 \leq n_5$, $R^{6e}$ is a hydrocarbon group having 2 to 20 carbon atoms in the main chain thereof, optionally having one or more phenyl groups, $2 \leq b_2$, $R^{8b}$ is a divalent to tetravalent organic group, and $R^{7b}$ is a divalent organic group, however, $R^{7b}$ may be absent depending on the structure of $R^{8b}$, or

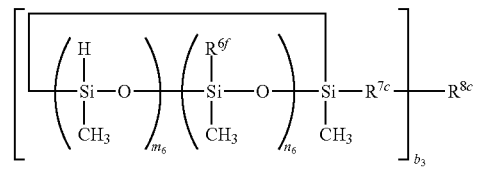

wherein $3 \leq m_6 + n_6 \leq 50$, $1 \leq m_6$, and $0 \leq n_6$, $R^{6f}$ is a hydrocarbon group having 2 to 20 carbon atoms in the main chain thereof, optionally comprising one or more phenyl groups, $2 \leq n_3$, $R^{8c}$ is a divalent to tetravalent organic group, and $R^{7c}$ is a divalent organic group, however, $R^{7c}$ may be absent depending on the structure of $R^{8c}$, and the like.

The component B preferably has good compatibility with the component A and the component C, or good dispersion stability in the system. Particularly, if the viscosity of the entire system is low, use of an ingredient whose compatibility with any of the above-described ingredients is low as the component B sometimes causes phase separation and a curing failure.

As a specific example of the component B having relatively good compatibility with the component A and the component C, or relatively good dispersion stability, the following can be mentioned.

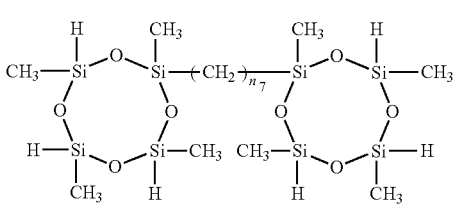

wherein $n_7$ is an integer of not less than 4 and not more than 10,

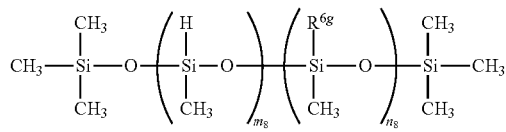

wherein $2 \leq n_8 \leq 10$ and $0 \leq n_8 \leq 5$, $R^{6g}$ is a hydrocarbon group having eight or more carbon atoms.

As specific preferable examples of the component B, polymethylhydrogen siloxane can be mentioned; for assuring compatibility with the component A and adjusting the SiH content, a compound modified with α-olefin, styrene, α-methylstyrene, allylalkyl ether, allylalkyl ester, allylphenyl ether, allylphenyl ester or the like can be mentioned; as an example, the following structure can be mentioned.

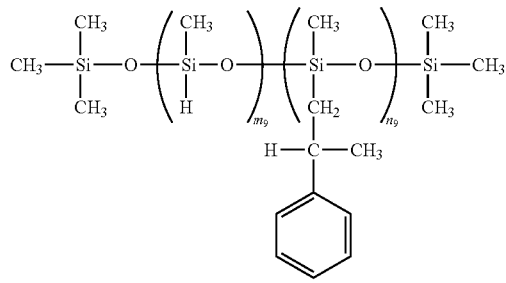

wherein $2 \leq m_9 \leq 20$ and $1 \leq n_9 \leq 20$.

The component B can be synthesized by a commonly known method, and any commercially available product can be used as is.

In the present invention, the component C hydrosilylation catalyst is not subject to limitation; an optionally chosen one can be used. As specific examples, chloroplatinic acid; simple substance platinum; solid platinum carried by a carrier such as alumina, silica, or carbon black; a platinum-vinylsiloxane complex {for example, $Pt_n(ViMe_2SiOSiMe_2Vi)_m$, $Pt[(MeViSiO)_4]_m$ and the like}; a platinum-phosphine complex {for example, $Pt(PPh_3)_4$, $Pt(PBu_3)_4$ and the like}; a platinum-phosphite complex {for example, $Pt[P(OPh)_3]_4$, $Pt[P(OBu)_3]_4$ and the like}; $Pt(acac)_2$; the platinum-hydrocarbon conjugates described in U.S. Pat. Nos. 3,159,601 and 3,159,662 of Ashby et al.; the platinum alcoholate catalyst described in U.S. Pat. No. 3,220,972 of Lamoreaux et al. and the like can be mentioned. (In the formulas above, Me represents a methyl group, Bu represents a butyl group, Vi represents a vinyl group, Ph represents a phenyl group, acac represents an acetylacetonate, and each of n and m represents an integer.)

As examples of catalysts other than platinum compounds, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like can be mentioned.

These catalysts may be used alone, and may be used in combination of 2 kinds or more. With regard to catalyst activity, chloroplatinic acid, a platinum-phosphine complex, a platinum-vinylsiloxane complex, $Pt(acac)_2$ and the like are preferable.

Although the amount of the component C formulated is not subject to limitation, from the viewpoint of assurance of composition potlife and sheet transparency, the amount is generally not more than $1 \times 10^{-1}$ mol, preferably not more than $5.3 \times 10^{-2}$ mol, relative to 1 mol of alkenyl groups in the component A; particularly, from the viewpoint of sheet transparency, the amount is more preferably not more than $3.5 \times 10^{-2}$ mol, particularly preferably not more than $1.4 \times 10^{-3}$ mol. If the amount exceeds $1 \times 10^{-1}$ mol relative to 1 mol of alkenyl groups in the component A, the finished impact absorption sheet is likely to undergo yellowing and the transparency of the sheet tends to be damaged. If the amount of the component C formulated is too low, the composition curing speed is slow, and the curing quality tends to be unstable; therefore, the amount is preferably not less than $8.9 \times 10^{-5}$ mol, more preferably not less than $1.8 \times 10^{-4}$ mol.

A composition comprising the above-described components A to C is characterized by the ability to exhibit its tacky characteristic (function to adhere to another object) even without the addition, or with the addition of a small amount, of an adhesiveness-imparting resin.

In the composition, it is preferable that the hydrosilyl groups of the component B (compound B) be contained (formulated) so that the functional group ratio to the alkenyl groups of the component A (compound A) will be not less than 0.3 and less than 2, more preferably not less than 0.4 and less than 1.8, and still more preferably not less than 0.5 and less than 1.5. When the hydrosilyl groups are contained so that the foregoing functional group ratio will exceed 2, the crosslinking density increases, and it is sometimes impossible to obtain adhesiveness without the addition, or with the addition of a small amount, of an adhesiveness-imparting resin. When the functional group ratio is less than 0.3, the crosslinking becomes too weak, and adhesive deposit upon redetachment and degraded characteristic retention at high temperatures may occur. Hence, by setting a blending ratio of the component A and the component B to fall within a particular range, good adhesiveness can be achieved even without adding an adhesiveness-imparting resin, and, in addition, the composition can be cured at a practically sufficiently fast line speed.

The composition comprising the above-described ingredients A to C may be formulated with a storage stability improving agent for the purpose of improving the storage stability. As this storage stability improving agent, a commonly known compound known as a storage stabilizer for the component B of the present invention can be used without limitation. For example, a compound comprising an aliphatic unsaturated bond, an organic phosphorus compound, an organic sulfur compound, a nitrogen-containing compound, a tin-series compound, an organic peroxide and the like can be suitably used. Specifically, 2-benzothiazolyl sulfide, benzothiazole, thiazole, dimethylacetylene dicarboxylate, diethylacetylene dicarboxylate, 2,6-di-t-butyl-4-methylphenol, butylhydroxyanisole, vitamin E, 2-(4-morpholinyldithio)benzothiazole, 3-methyl-1-butene-3-ol, 2-methyl-3-butene-2-ol, organosiloxane containing an acetylenic unsaturated group, acetylene alcohol, 3-methyl-1-butyl-3-ol, diallyl fumarate, diallyl maleate, diethyl fumarate, diethyl maleate, dimethyl maleate, 2-pentenenitrile, 2,3-dichloropropene and the like can be mentioned, but these are not to be construed as limiting.

An adhesion-imparting agent for improving the adhesion property to the display panel of the flat panel display can be added as required. As examples of the adhesion provider, various silane coupling agents, epoxy resins and the like can be mentioned. In particular, a silane coupling agent having a functional group such as an epoxy group, a methacryloyl group, or a vinyl group is preferable because its influence on the curing quality is small and also because it is highly effective for the manifestation of adhesiveness. In combination with a silane coupling agent and an epoxy resin, a catalyst for reacting silyl groups or epoxy groups can be added. When using them, their influence on the hydrosilylation reaction must be taken into consideration. Various filling agents, antioxidants, UV absorbents, pigments, surfactants, solvents, and silicon compounds may be added to the composition as appropriate. As specific examples of the above-described filling agents, silica micropowder, calcium carbonate, clay, talc, titanium oxide, zinc oxide, diatomaceous earth, barium sulfate and the like can be mentioned. Of these filling agents, silica micropowder, particularly micropowder silica having a particle diameter of about 50 to 70 nm (the BET specific surface area is 50 to 380 m$^2$/g) is preferable; in particular, surface-treated hydrophobic silica is particularly preferable because of its high function to improve the strength in the preferred direction. Furthermore, a tackifier resin may be added to the composition as required to enhance the tack and other characteristics thereof; as examples of the tackifier resin, terpene resin, terpene phenol resin, petroleum resin, rosin ester and the like can be mentioned, one of which can be freely selected according to the intended use.

For the characteristic improvements, resins such as phenol resin, acrylic resin, styrene resin, and xylene resin can be added. An adhesive ingredient such as an acrylic adhesive, a styrene block-series adhesive, or an olefin-series adhesive can be added for the same purpose.

The transparent adhesive sheet shows superior non-corrosiveness to transparent conducting materials (particularly non-corrosiveness to ITO) such as ITO, TO (tin oxide), ZnO (zinc oxide), CTO (tin oxide cadmium) and the like and does not corrode a transparent conducting material even upon contact therewith. Therefore, it advantageously acts after adhesion of a transparent protection plate to a glass plate having a transparent electrode for a touch panel.

Such transparent adhesive sheet can be produced, for example, by the following method.

A polyoxyalkylene-series polymer, preferably a composition comprising the above-described ingredients A to C, along with an organic solvent as required, is charged to a stirrer with vacuum function and stirred and hence defoamed in a vacuum (under vacuum conditions), and the resulting fluidized product after the vacuum defoaming is coated (cast) on various supports and thermally treated to obtain a sheet. Coating on the support can be performed using, for example, a commonly known coating apparatus such as a gravure coater; a roll coater such as a kiss coater or a comma coater; a die coater such as a slot coater or a fountain coater; a squeeze coater, a curtain coater and the like. Regarding the heat treatment conditions in this case, it is preferable that the composition be heated at 50 to 200° C. (preferably 100 to 160° C.) for about 0.01 to 24 hours (preferably 0.05 to 4 hours). As the above-described stirrer with vacuum function, a commonly known stirrer equipped with vacuum apparatus may be used; specifically, a planetary (revolution type/rotation type) stirring defoaming apparatus, a defoaming apparatus equipped with a disperser, and the like can be mentioned. The degree of pressure reduction in performing vacuum defoaming is preferably not more than 10 kPa, more preferably not more than 3 kPa. Stirring time varies also depending on the choice of stirrer and the throughput of fluidized product, and is generally preferably about 0.5 to 2 hours. Due to the defoaming treatment, the inside of the sheet is substantially free of a void, and superior optical property (transparency) can be achieved. For example, the haze value of the sheet as measured by the below-mentioned test method is preferably not more than 1.2%, more preferably not more than 0.9%.

When such a transparent adhesive sheet is used for adhesion of two optical plates to be set on the display surface side of the flat-panel display to be mounted on portable instruments with display function such as portable telephone, Personal Digital Assistant (PDA), handheld game machine, car-navigation system and the like, it needs to be processed into a sheet having a small area size. In consideration of mass productivity (productive efficiency), for example, it is preferable to prepare a roll having a laminate constitution of first support (base separator)/cured product layer of composition containing the above-mentioned components A-C (transparent adhesive sheet)/second support (cover separator), and perform punching processing while unwinding the roll to produce the sheet.

The above-mentioned roll can be prepared by, for example, coating the first support with a mold release agent to perform a mold release treatment, stirring and vacuum defoaming the composition containing the above-mentioned components A-C, applying (casting) the fluid after the vacuum defoamation on the first support, heat-treating same to give a sheet, adhering the second support after a mold release treatment thereto and winding the sheet into a roll.

Examples include single layer films (sheets) made of thermoplastic resins such as polyester (e.g., polybutylene terephthalate (PBT) and the like), ionomer resin wherein molecules of ethylene-methacrylic acid copolymer are crosslinked with metal ion (Na$^+$, Zn$^{2+}$ etc.), EVA (ethylene-vinyl acetate copolymer), PVC (polyvinyl chloride), EEA (ethylene-ethylacrylate copolymer), PE (polyethylene), PP (polypropylene), polyamide, poly butyral, polystyrene and the like; various thermoplastic elastomers showing rubber elasticity such as polystyrene series, polyolefin series, polydiene series, vinyl chloride series, polyurethane series, polyester series, polyamide series, fluorine series, chlorinated polyethylene series, polynorbornane series, polystyrene-polyolefin copolymer series, (hydrogenated) polystyrene-butadiene copolymer series, polystyrene-vinylpolyisoprene copolymer series and the like; polyolefin such as polyethylene, polypropylene and the like blended with a thermoplastic elastomer and the like, films (sheets) having multiple layers (laminate) made of polyolefin (polypropylene (PP) or polyethylene (PE) etc.)/thermoplastic resin (e.g., EVA)/polyolefin, polyolefin (PP or PE)+thermoplastic elastomer/polyolefin (PP or PE), PP/PE/PP and the like, multi-layer (laminate) of composite polyolefin+thermoplastic elastomer with varying blending ratios, etc., and the like. In addition, impregnated paper, coated paper, quality paper, craft paper, cloth, acetate cloth, non-woven fabric, glass cloth and the like can be mentioned.

As the mold release agent to be used for the first and second supports, for example, silicone mold release treatment agent, fluorine mold release treatment agent, long chain alkyl mold release treatment agent etc. can be applied to the support surface. Of these, a silicone mold release treatment agent is preferable. As the curing method, a curing method such as UV irradiation, electron beam irradiation and the like are preferably used. Furthermore, of the silicone mold release treatment agents, a cation polymerizable UV curing silicone mold release treatment agent is preferable. A cation polymerizable UV curing silicone mold release treatment agent is a mixture of a cation polymerizable silicone (polyorganosiloxane having an epoxy functional group in a molecule) and an onium salt photoinitiator. Such agent wherein the onium salt photoinitiator is a boron photoinitiator is particularly preferable. Using such a cation polymerizable UV curing silicone mold release treatment agent wherein the onium salt photoinitiator is a boron photoinitiator, particularly good release property (mold releaseability) can be obtained. A cation polymerizable silicone (polyorganosiloxane having an epoxy functional group in a molecule) has at least two epoxy functional groups in one molecule, which may be linear or branched chain, or a mixture of these. While the kind of an epoxy functional group contained in polyorganosiloxane is not particularly limited, it only needs to permit progress of cationic ring-opening polymerization by an onium salt photoinitiator. Specific examples thereof include γ-glycidyloxypropyl group, β-(3,4-epoxycyclohexyl)ethyl group, β-(4-methyl-3,4-epoxycyclohexyl) propyl group and the like. Such cation polymerizable silicone (polyorganosiloxane having an epoxy functional group in a molecule) is marketed and a commercially available product can be used. For example, UV9315, UV9430, UV9300, TPR6500, TPR6501 and the like manufactured by Toshiba Silicone Co., Ltd., X-62-7622, X-62-7629, X-62-7655, X-62-7660, X-62-7634A and the like manufactured by Shin-Etsu Chemical Co., Ltd., Poly200, Poly201, RCA200, RCA250, RCA251 and the like manufactured by Arakawa Chemical Industries, Ltd. can be mentioned.

Of the cationic polymerizable silicones, polyorganosiloxane comprising the following structural units (A)-(C) is particularly preferable.

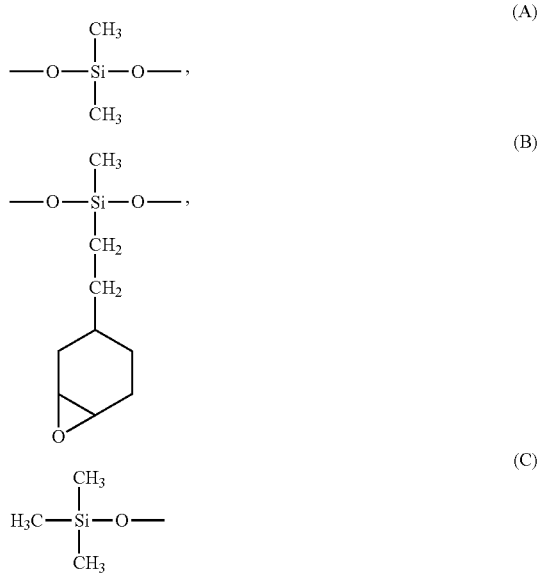

In polyorganosiloxane comprising such structural units (A)-(C), the composition ratio ((A):(B):(C)) of structural units (A)-(C) is particularly preferably 50-95:2-30:1-30 (mol %), and especially preferably 50-90:2-20:2-20 (mol %). Polyorganosiloxane comprising such structural units (A)-(C) is available as Poly200, Poly201, RCA200, X-62-7622, X-62-7629 and X-62-7660.

On the other hand, as the onium salt photoinitiator, known product can be used without particular limitation. Specific examples include a compound represented by $(R^1)_2I^+X^-$, $ArN_2^+X^-$ or $(R^1)_3S^+X^-$ (wherein $R^1$ is alkyl group and/or aryl group, Ar is aryl group, $X^-$ is $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$, $BF_4^-$, $PF_6^-$, $AsF_6^-$, $HSO_4^-$, $ClO_4^-$ and the like). Of these, a compound of the formula (boron photoinitiator) wherein $X^-$ is $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$ or $BF_4^-$ is preferable, and a compound represented by $(R^1)_2I^+[B(C_6F_5)_4]^-$ (wherein $R^1$ is substituted or unsubstituted phenyl group) (alkyl iodonium, tetrakis(pentafluorophenyl)borate) is particularly preferable. As the onium salt photoinitiator, antimony (Sb) initiator is conventionally known. However, when an antimony (Sb) initiator is used, double detachment occurs and detachment of an impact absorption sheet from a support tends to be difficult.

While the amount of the onium salt photoinitiator to be used is not particularly limited, it is about preferably 0.1-10 parts by weight relative to 100 parts by weight of the cationic polymerizable silicone (polyorganosiloxan). When the amount of use is smaller than 0.1 part by weight, curing of the silicone peel layer may become insufficient. When the amount of use is greater than 10 parts by weight, the cost becomes impractical. When a cationic polymerizable silicone (polyorganosiloxan) and an onium salt photoinitiator are mixed, the onium salt photoinitiator may be dissolved or dispersed in an organic solvent and then mixed with polyorganosiloxan. Specific examples of the organic solvent include alcohol solvents such as isopropyl alcohol, n-butanol and the like; ketone solvents such as acetone, methylethylketone and the like; ester solvents such as ethyl acetate, and the like, and the like.

A mold release treatment agent can be applied, for example, using a general coating apparatus such as those used for roll coater method, reverse coater method, doctor blade method and the like. While the coating amount (solid content) of the mold release treatment agent is not particularly limited, it is generally about 0.05-6 mg/cm².

The adhesive sheet residue and curable resin layer residue attached to the plate detached by the method of the present invention are washed away with a solvent. A suitable solvent is selected depending on the kind of an adhesive sheet, material of the plate and the like. In the case of an acrylic adhesive sheet, for example, alcohol solvents such as isopropyl alcohol and the like are preferable. Besides these, ketone (acetone, methylethyl ketone and the like), ether (tetrahydrofuran, ethylene glycol diethyl ether and the like), ester (methyl acetate, ethyl acetate, ethylene glycol monomethyletheracetate, ethylene glycol monoethyletheracetate, glycol diacetate etc.) solvents can also be used. In the case of a transparent polyoxyalkylene adhesive sheet, for example, alcohol solvents such as isopropyl alcohol and the like are preferable. Besides these, ketone (acetone, methylethyl ketone and the like), ether (tetrahydrofuran, ethylene glycol diethylether and the like), ester (methyl acetate, ethyl acetate, ethylene glycol monomethyletheracetate, ethylene glycol monoethyletheracetate, glycol diacetate etc.) solvents and the like can also be used.

Examples

The present invention is explained in more detail in the following by referring to Examples and Comparative Examples.

The parts and % in the following are based on the weight.

Example 1

[Preparation of Transparent Polyoxyalkylene Adhesive Sheet]

A composition (manufactured by KANEKA Corporation) containing a polyoxyalkylene-series polymer for component (A) (number average molecular weight: about 20,000), a hydrosilyl compound for component B in an amount that affords a functional group ratio (molar ratio) of 0.75, and a hydrosilylation catalyst for component C (containing 0.9× $10^{-3}$ mol per 1 mol of alkenyl group in component A) was placed in a stirrer with a vacuum apparatus (Mini Dappo manufactured by SEATEC CORPORATION), and the mixture was stirred in vacuo (100 Pa) for 1 hr for defoaming. Then, the vacuum defoamed composition was applied (cast) onto a base separator (support) made of a polyester film (thickness: 100 μm) subjected to a mold release treatment, using a roll coater at room temperature to a composition thickness of 200 μm. The composition was cured by heating in a heating oven at 130° C. for 10 min. A cover separator (release liner) made of a polyester film (thickness: 100 μm) subjected to a mold release treatment in the same manner was adhered to the thus-obtained cured sheet to give a transparent adhesive sheet (thickness: 200 μm).

The adhesive strength (N/25 mm) of the transparent adhesive sheet to a soda glass was measured to be 4N/25 mm. As to the adhesive strength, a poly(ethylene terephthalate) film (thickness 25 μm) free of a mold release treatment was adhered to one surface of the above-mentioned transparent adhesive sheet, a specimen piece (width 25 mm, length 100 mm) was cut out and press adhered to a soda glass plate (thickness 0.7 mm) under adhesion conditions of a 2 kg roller by one reciprocation, subjected to an autoclave treatment (0.6 MPa, 60° C., 30 min) and left standing at ambient temperature (23° C.) for 1 week to give a sample for measurement. The measurement sample was subjected to a 1800 peeling test according to JIS Z 0237 at a tension rate of 300 mm/min and the release force (N/25 mm) thereof was taken as a glass adhesive strength.

[Preparation of Specimen]

A rectangular soda glass plate (thickness 1.0 mm, length 100 mm, width 50 mm) and a rectangular soda glass plate (thickness 0.7 mm, length 100 mm, width 50 mm) were prepared. The transparent adhesive sheet (thickness: 200 μm) prepared above was cut into rectangles having the same shape and area as those of the soda glass plates. The sheet was adhered to one soda glass plate (thickness 1.0 mm), and the other soda glass plate (thickness 0.7 mm) was adhered thereto. The resulting product was subjected to an autoclave treatment (0.6 MPa, 60° C., 30 min), left standing at ambient temperature (23° C.) for one week to give a specimen (bonded laminate plate) consisting of soda glass plate (thickness 1.0 mm)/transparent adhesive sheet (thickness 0.2 mm)/soda glass plate (thickness 0.7 mm).

The specimen was assumed to be a bonded laminate plate wherein a glass plate with a transparent electrode for a touch panel and a transparent protection plate were adhered via a transparent adhesive sheet.

[Detachment Operation]

One surface of a 0.3 mm-thick thermally releasable two-sided adhesive sheet ("REVALPHA" (trade name), manufactured by NITTO DENKO CORPORATION) cut into a rectangle having the same area as the specimen was adhered to one soda glass plate (thickness 1.0 mm) of the (soda glass plate (thickness 1.0 mm)/transparent adhesive sheet (thickness 200 μm)/soda glass plate (thickness 0.7 mm)), and the other surface of the thermally releasable two-sided adhesive sheet was adhered to a PMMA (polymethyl methacrylate) fixing stand. Then, one surface of a 0.3 mm-thick thermally releasable two-sided adhesive sheet ("REVALPHA" (trade name), manufactured by NITTO DENKO CORPORATION) cut into a rectangle having the same area as the specimen was adhered to the other soda glass plate (thickness 0.7 mm) immobilized on the fixing stand in this way. One end in the longitudinal direction of a stainless plate (length 250 mm, width 70 mm, thickness 1.0 mm) was adhered to the other surface of the thermally releasable two-sided adhesive sheet, and the operation shown in FIG. 4 was performed to move the stainless plate until the rotation angle reached not less than 10°. As a result, the two soda glass plates were detached. Then, the surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

Example 2

In the same manner as in Example 1 except that the standing still treatment after the autoclave treatment was performed at 50° C. for 1 week, a sample for measurement of adhesive strength to the soda glass and a specimen (bonded laminate plate) were prepared. In the same manner as in Example 1, the adhesive strength of the transparent adhesive sheet to the soda glass was measured, and the plates were detached. The adhesive strength of the transparent adhesive sheet to the soda glass was 5N/25 mm. The two soda glass plates could be detached. The surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

Example 3

In the same manner as in Example 1 except that the standing still treatment after the autoclave treatment was performed at −40° C. for 1 week, a sample for measurement of adhesive strength to the soda glass and a specimen (bonded laminate plate) were prepared. In the same manner as in Example 1, the adhesive strength of the transparent adhesive sheet to the soda glass was measured. As a result, the adhesive strength was 8N/25 mm. In addition, one surface of a 0.3 mm-thick thermally releasable two-sided adhesive sheet ("REVALPHA" (trade name), manufactured by NITTO DENKO CORPORATION) cut into a rectangle having the same area as the specimen was adhered to one soda glass plate (thickness 1.0 mm) of the sample (soda glass plate (thickness 1.0 mm)/transparent adhesive sheet (thickness 200 μm)/soda glass plate (thickness 0.7 mm)), and the other surface of the thermally releasable two-sided adhesive sheet was adhered to an operation plate (length 250 mm, width 70 mm, thickness 1.0 mm). Further, one surface of a 0.3 mm-thick thermally releasable two-sided adhesive sheet ("REVALPHA" (trade name), manufactured by NITTO DENKO CORPORATION) cut into a rectangle having the same area as the specimen was adhered to the other soda glass plate (thickness 0.7 mm). One end in the longitudinal direction of a stainless plate (length 250 mm, width 70 mm, thickness 1.0 mm) was adhered to the other surface of the thermally releasable two-sided adhesive sheet, and both operation plates were rotationally moved to opposite directions in a flat plane orthogonal to the thickness direction of the bonded laminate plate (transparent adhesive sheet) and moved until the angle of move (relative angle) between the both stainless plates reached not less than 10°. As a result, the two soda glass plates were detached. The surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

Example 4

2-Ethylhexylacrylate (99 parts), 4-hydroxybutylacrylate (1 part), 2,2-dimethoxy-1,2-diphenylethan-1-one (0.12 part) and 1-hydroxy-cyclohexyl-phenyl-ketone (0.12 part) were placed in a four-neck flask, and partial photopolymerization was performed by exposure to UV irradiation under a nitrogen atmosphere to give a partially polymerized product (monomer syrup) having a polymerization rate of 10%.

An isocyanate compound (CORONATE L manufactured by NIPPON PLYURETHANE INDUSTRY CO., LTD., 0.10 part) was added to the partially polymerized product (100 parts), and they were uniformly mixed to give a photopolymerizable composition.

The above-mentioned photopolymerizable composition was applied to a thickness of 150 µm on a release treated surface of a 75 µm-thick polyester film wherein one surface thereof was release treated with silicone, and a release treated surface of a 38 µm-thick polyester film wherein one surface thereof was release treated with silicone was adhered thereon. Then, UV rays were irradiated on the 38 µm-thick polyester film surface by a black-light at a lamp height adjusted such that the illumination intensity on the irradiation surface right under the lamp was 5 mW/cm$^2$. Polymerization was performed until the irradiation light intensity reached about 3600 mJ/cm$^2$ to give an acrylic transparent adhesive sheet (thickness: 150 µm).

In the same manner as in Example 1 except that the above-mentioned acrylic transparent adhesive sheet was used as the transparent adhesive sheet, measurement of adhesive strength of the transparent adhesive sheet to the soda glass, preparation of a specimen and plate detachment were performed. The adhesive strength of the transparent adhesive sheet to the soda glass was 8N/25 mm. In addition, the two soda glass plates could be detached. The surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

Example 5

In the same manner as in Example 4 except that the standing still treatment after the autoclave treatment was performed at −40° C. for 1 week, a sample for measurement of adhesive strength to the soda glass and a specimen (bonded laminate plate) were prepared. In the same manner as in Example 4, the adhesive strength of the transparent adhesive sheet to the soda glass was measured, and the plates were detached. The adhesive strength of the transparent adhesive sheet to the soda glass was 10N/25 mm. In addition, the two soda glass plates could be detached. The surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

Example 6

2-Ethylhexylacrylate (85 parts), 4-hydroxybutylacrylate (15 parts), 2,2-dimethoxy-1,2-diphenylethan-1-one (0.12 part) and 1-hydroxy-cyclohexyl-phenyl-ketone (0.12 part) were placed in a four-neck flask, and partial photopolymerization was performed by exposure to UV irradiation under a nitrogen atmosphere to give a partially polymerized product (monomer syrup) having a polymerization rate of 10%.

Trimethylolpropane triacrylate (0.2 part) was added to the partially polymerized product (100 parts), and they were uniformly mixed to give a photopolymerizable composition.

The above-mentioned photopolymerizable composition was applied to a thickness of 200 µm on a release treated surface of a 75 µm-thick polyester film wherein one surface thereof was release treated with silicone, and a release treated surface of a 38 µm-thick polyester film wherein one surface thereof was release treated with silicone was adhered thereon. Then, UV rays were irradiated on the 38 µm-thick polyester film surface by a metal halide lamp at a lamp height adjusted such that the illumination intensity on the irradiation surface right under the lamp was 30 mW/cm$^2$. Polymerization was performed until the irradiation light intensity reached about 7200 mJ/cm$^2$ to give an acrylic transparent adhesive sheet (thickness: 200 µm).

In the same manner as in Example 1 except that the above-mentioned acrylic transparent adhesive sheet was used as the transparent adhesive sheet, measurement of adhesive strength of the transparent adhesive sheet to the soda glass, preparation of a specimen and plate detachment were performed. The adhesive strength of the transparent adhesive sheet to the soda glass was 10N/25 mm. In addition, the two soda glass plates could be detached. The surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

Example 7

In the same manner as in Example 6 except that the standing still treatment after the autoclave treatment was performed at −40° C. for 1 week, a sample for measurement of adhesive strength to the soda glass and a specimen (bonded laminate plate) were prepared. In the same manner as in Example 6, the adhesive strength of the transparent adhesive sheet to the soda glass was measured, and the plates were detached. The adhesive strength of the transparent adhesive sheet to the soda glass was 11N/25 mm. In addition, the two soda glass plates could be detached. The surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

Example 8

Isononylacrylate (90 parts), acrylic acid (10 parts), 2,2-dimethoxy-1,2-diphenylethan-1-one (0.12 part) and 1-hydroxy-cyclohexyl-phenyl-ketone (0.12 part) were placed in a four-neck flask, and partial photopolymerization was performed by exposure to UV irradiation under a nitrogen atmosphere to give a partially polymerized product (monomer syrup) having a polymerization rate of 10%.

Trimethylolpropane triacrylate (0.2 part) was added to the partially polymerized product (100 parts), and they were uniformly mixed to give a photopolymerizable composition.

The above-mentioned photopolymerizable composition was applied to a thickness of 175 µm on a release treated surface of a 75 µm-thick polyester film, which had been release treated with silicone, and a release treated surface of a 38 µm-thick polyester film wherein one surface thereof was release treated with silicone was adhered thereon. Then, UV rays were irradiated on the 38 µm-thick polyester film surface by a metal halide lamp at a lamp height adjusted such that the illumination intensity on the irradiation surface right under the lamp was 30 mW/cm$^2$. Polymerization was performed until the irradiation light intensity reached about 7200 mJ/cm$^2$ to give an acrylic transparent adhesive sheet (thickness: 175 µm).

In the same manner as in Example 1 except that the above-mentioned acrylic transparent adhesive sheet was used as the transparent adhesive sheet and the standing still treatment after the autoclave treatment, which was for the preparation of a sample for measurement of adhesive strength to the soda glass and a specimen (bonded laminate plate), was performed at −40° C. for 1 week, measurement of adhesive strength of the transparent adhesive sheet to the soda glass, preparation of a specimen and plate detachment were performed. The adhesive strength of the transparent adhesive sheet to the soda glass was 3N/25 mm. In addition, the two soda glass plates could be detached. The surface of the detached two glass plates was washed with isopropyl alcohol to remove remaining adhesive component attached thereto, and the surface was observed with a digital microscope VHF-100F manufactured by Keyence Corporation. As a result, the two soda glass plates were free of cracks, breakage and scar.

According to the present invention, two plates adhered via an adhesive sheet or a curable resin layer can be detached from each other substantially without a force (load) which causes high distortion (deformation) producing a breakage or crack on the plates, even when at least one of the two plates is thin and poor in flexibility. Particularly, two optical plates adhered via a transparent adhesive sheet or curable resin layer (e.g., a display panel and a transparent protection plate, a display panel and a glass plate with a transparent electrode for a touch panel, a glass plate with a transparent electrode for a touch panel and a transparent protection plate etc.), which are set on the display surface side of the flat-panel display, are thin and poor in flexibility. However, such two optical plates can be detached without causing a breakage or crack by the method of the present invention. Accordingly, the present invention can be practiced particularly advantageously in the fields of flat-panel display and equipment with display function, which carries a flat-panel display.

The invention claimed is:

1. A method of detaching two plates adhered via an adhesive sheet comprising moving, relatively parallel to each other, said two plates to develop a shear stress causing rupture of said adhesive sheet,
    wherein:
    the adhesive sheet is a transparent adhesive sheet,
    the two plates are adhered on the whole surface of one side of each plate via the transparent adhesive sheet,
    one of the two plates is a display panel of a flat-panel display and the other is a transparent protection plate to protect said display panel or a glass plate with a transparent electrode for a touch panel, and
    the two plates may be reused after the method of detaching.

2. The method of claim 1, wherein at least one of the two plates is moved such that virtual straight lines in the surface of the adhesive sheet adhered to one plate and the surface of the adhesive sheet adhered to the other plate become skewed relative to each other, wherein the virtual straight lines in the surfaces of the adhesive sheet are parallel to each other.

3. The method of claim 1, wherein the adhesive sheet adhering the two plates is ruptured by bonding an exterior surface of one of the two plates adhered via an adhesive sheet to a fixing stand, bonding a part of an operation plate to an exterior surface of the other plate, and rotationally moving other plate together with the operation plate in a plane orthogonal to a thickness direction of the adhesive sheet.

4. The method of claim 1, wherein the adhesive sheet is ruptured by rotationally moving at least one plate in a plane orthogonal to a thickness direction of said adhesive sheet.

5. The method of claim 1, wherein the transparent adhesive sheet is an acrylic, silicone or polyoxyalkylene transparent adhesive sheet.

* * * * *